United States Patent
Veres et al.

(10) Patent No.: US 11,438,866 B2
(45) Date of Patent: Sep. 6, 2022

(54) REAL-TIME LOCATION SYSTEM INFRASTRUCTURE FOR EASY AND QUICK DEPLOYMENT AND CONFIGURATION

(71) Applicant: Telefonaktiebolaget LM Ericsson (publ), Stockholm (SE)

(72) Inventors: András Veres, Budapest (HU); Zsolt Kenesi, Budapest (HU); Tamas Borsos, Budapest (HU); Péter Hága, Budapest (HU); Zsófia Kallus, Budapest (HU); Mate Szebenyei, Maglod (HU); Peter Vaderna, Budapest (HU); István Gódor, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 17/042,329

(22) PCT Filed: Mar. 28, 2019

(86) PCT No.: PCT/IB2019/052571
§ 371 (c)(1),
(2) Date: Sep. 28, 2020

(87) PCT Pub. No.: WO2019/186473
PCT Pub. Date: Oct. 3, 2019

(65) Prior Publication Data
US 2021/0029668 A1    Jan. 28, 2021

Related U.S. Application Data

(60) Provisional application No. 62/650,324, filed on Mar. 30, 2018.

(51) Int. Cl.
*H04W 64/00* (2009.01)
*H04B 1/40* (2015.01)
*H04W 84/18* (2009.01)

(52) U.S. Cl.
CPC ............ *H04W 64/006* (2013.01); *H04B 1/40* (2013.01); *H04W 64/003* (2013.01); *H04W 84/18* (2013.01)

(58) Field of Classification Search
CPC ............... G06Q 10/0833; G06Q 50/28; G06Q 20/3278; G06Q 50/02; G06Q 10/08;
(Continued)

(56) References Cited

U.S. PATENT DOCUMENTS

9,536,215 B2 *    1/2017   Rehman ................. G06Q 10/08
2009/0174569 A1   7/2009   Smith et al.
(Continued)

*Primary Examiner* — Kwasi Karikari
(74) *Attorney, Agent, or Firm* — Coats + Bennett, PLLC (57) ABSTRACT

An anchor system for a location system tracks a location of a tag device mounted to a mobile entity using a plurality of anchor devices. The anchor system comprises an anchor cable, a first anchor device affixed to the anchor cable, one or more second anchor devices affixed to the anchor cable, and a power supply circuit. Each of the second anchor device(s) is spaced from the first anchor device along a length of the anchor cable by a predetermined distance. The power supply circuit is operatively connected to the anchor cable and is configured to supply power to each of the anchor devices via the anchor cable. Each of the anchor devices is configured to wirelessly communicate with the tag device, e.g., which enables a remote network of processors in communication with the anchor devices to determine location data for the tag device.

18 Claims, 7 Drawing Sheets

(58) Field of Classification Search
CPC ............. G06Q 20/325; G06Q 10/0836; G06Q 10/083; G06Q 10/08355; G06Q 10/20; G06Q 20/18; G06Q 20/203; G06Q 30/0641; G06K 19/0723; G06K 7/10356; G06K 7/1417; G06K 2007/10504; G06K 7/10297; G06K 7/10762; G06K 7/10861; G06K 7/1443; G06K 9/6201; G06K 9/627; H04W 4/80; H04W 4/029; H04W 4/023; H04W 4/70; H04W 12/63; H04W 16/20; H04W 4/33; H04W 4/35; H04W 84/18; H04W 88/027; H04W 8/005

See application file for complete search history.

(56) References Cited

U.S. PATENT DOCUMENTS

| | | | |
|---|---|---|---|
| 2011/0050501 A1 | 3/2011 | Aljadeff | |
| 2016/0350564 A1 | 12/2016 | Nedelcu | |
| 2017/0214117 A1* | 7/2017 | Gracyk | G01S 13/767 |
| 2017/0215038 A1* | 7/2017 | Primm | H04L 5/14 |
| 2018/0200761 A1* | 7/2018 | Putcha | B07C 3/18 |

* cited by examiner

REAL-TIME LOCATION SYSTEM INFRASTRUCTURE FOR EASY AND QUICK DEPLOYMENT AND CONFIGURATION

RELATED APPLICATIONS

This application claims priority to U.S. application Ser. No. 62/650,324, filed 30 Mar. 2018, the disclosure of which is incorporated in its entirety by reference herein.

BACKGROUND

Precise localization systems are applied to determine the position of and track objects and/or people in various environments. The applied systems rely on deployed infrastructure components, such as anchors (installed infrastructure components), to determine the location of tags and tags devices (mounted on various, and typically mobile, objects and/or people). The deployment project's length, complexity, calibration, and configuration difficulties impact deployment costs and the competence required for the project.

An infrastructure solution that supports easy and quick deployment, calibration, and configuration contributes to 1) decreased deployment project length, and 2) lower competence needed to perform the deployment, and thus lowers the cost of the deployment. It is desirable to overcome one or more of these challenges.

SUMMARY

Certain aspects of the solution presented herein, and the associated embodiments, may provide solutions to these or other challenges. The proposed solution is to create a cable-like infrastructure that integrates
   Anchors;
   Power supply for the anchors; and
   Optionally, a network (e.g., Ethernet) connection to the anchors.
Per the solution presented herein, the cable and the anchors are integrated, e.g., the anchors are installed at known distances along the cable.

Certain embodiments may provide one or more of the following technical advantage(s):
   The installation is quick and easy because the cable of anchors can be mounted on the wall or on a metal structure. Thus, many anchors may be deployed at the same time.
   The solution is applicable in many different environments, even without any local infrastructure support.
   The solution can be connected to power supply on one end only, where the cable provides the connected power to all anchors in the cable.
   Calibration is quick and easy because the locations of the anchors within the cable are known in advance.
   Configuration is quicker because the anchor identifiers for the anchors in the cable are known in advance.
   The present disclosure generally includes the following embodiments, e.g., which may address one or more of the issues disclosed herein.

One exemplary embodiment comprises an anchor system for a location system configured to track a location of a tag device mounted to a mobile entity using a plurality of anchor devices. The anchor system comprises an anchor cable, a first anchor device affixed to the anchor cable, one or more second anchor devices affixed to the anchor cable, and a power supply circuit. Each of the one or more second anchor devices is spaced from the first anchor device along a length of the anchor cable by a predetermined distance. The power supply circuit is operatively connected to the anchor cable and is configured to supply power to each of the first and second anchor devices via the anchor cable. Each of the first and second anchor devices is configured to wirelessly communicate with the tag device, which e.g., enables a remote network of processors in communication with the anchor devices to determine location data for the tag device.

According to a further embodiment, the first and second anchor devices are distributed evenly along the length of the anchor cable.

According to a further embodiment, at least some of the one or more second anchor devices are distributed unevenly along the length of the anchor cable.

According to a further embodiment, the anchor cable further comprises a transceiver connection operatively connected to each of the first and second anchor devices via the anchor cable to provide connectivity between the remote network of processors and the first and second anchor devices.

According to a further embodiment, the transceiver connection comprises an Ethernet connection operatively providing wired connectivity between the remote network of processors and the first and second anchor devices.

According to a further embodiment, the transceiver connection comprises a wireless connection operatively providing wireless connectivity between the remote network of processors and the first and second anchor devices.

According to a further embodiment, each of the first and second anchor devices is affixed to the anchor cable using shrink wrap.

According to a further embodiment, each of the first and second anchor devices is affixed to the anchor cable using a cubic encapsulating structure.

According to a further embodiment, each of the first and second anchor devices is affixed to the anchor cable using a cylindrical encapsulating structure.

According to a further embodiment, the first and second anchor devices are affixed to the anchor cable by being at least partially disposed within the anchor cable.

According to a further embodiment, the first anchor device is affixed to one end of the anchor cable.

According to a further embodiment, the power supply circuit is affixed to one end of the anchor cable.

Another exemplary embodiment comprises a method of deploying a plurality of anchor devices at an anchor location, the plurality of anchor devices configured to communicate with a tag device mounted to a mobile entity. The method comprises receiving, at a remote network of processors, a calibration signal from an anchor system placed at the anchor location. The anchor system comprises an anchor cable, a first anchor device affixed to the anchor cable, one or more second anchor devices affixed to the anchor cable, and a power supply. Each of the one or more second anchor devices is spaced from the first anchor device along a length of the anchor cable by a predetermined distance. The power supply circuit is operatively connected to the anchor cable and is configured to supply power to each of the first and second anchor devices via one or more power lines disposed within the anchor cable. The method further comprises determining, at the remote network of processors, a location of each of the first and second anchor devices responsive to the calibration signal by determining a first location of the first anchor device relative to the anchor location, and for each of the one or more second anchor devices, determining a second location using the first location and the corresponding predetermined distance. The method further comprises configuring the first and second anchor devices to wirelessly communicate with the tag device. Once configured, the remote network of processors can determine location data for the tag device.

According to a further embodiment, the method further comprises providing wired connectivity between the remote network of processors and the first and second anchor devices using an Ethernet connection operatively connected to each of the first and second anchor devices via the anchor cable.

According to a further embodiment, the method further comprises providing wireless connectivity between the remote network of processors and the first and second anchor devices using a wireless transceiver operatively connected to each of the first and second anchor devices via the anchor cable.

According to a further embodiment, the method further comprises receiving, at the remote network of processors, additional location information regarding the anchor cable relative to the anchor location, where determining the second location for each of the one or more second anchor devices comprises determining, for each of the one or more second anchor devices, the second location using the first location, the corresponding predetermined distance, and the additional location information.

According to a further embodiment, the additional location information comprises at least one of a number of bends in the anchor cable between the beginning and the end of the anchor cable, and a direction and an angle of one or more of the bends.

Another exemplary embodiment comprises a remote network of processors configured to perform any of the steps of the described method.

Another exemplary embodiment comprises a remote network of processors comprising processing circuitry and power supply circuitry. The processing circuitry is configured to perform any of the steps of the described method. The power supply circuitry is configured to supply power to the remote network of processors.

Another exemplary embodiment comprises a remote network of processors comprising processing circuitry and memory. The memory contains instructions executable by the processing circuitry whereby the remote network of processors is configured to perform any of the steps of the described method.

Another exemplary embodiment comprises a computer program product for controlling at least one processor of a remote network of processors, the computer program product comprising software instructions which, when run on the at least one processor in the remote network of processors, causes the remote network of processors to execute the steps of the described method.

Another exemplary embodiment comprises a carrier containing the computer program product, wherein the carrier is one of an electronic signal, optical signal, radio signal, or computer readable storage medium.

Another exemplary embodiment comprises a computer-readable medium comprising the computer program product.

In another exemplary embodiment, the computer-readable medium comprises a non-transitory computer-readable medium.

DETAILED DESCRIPTION

Figure 1:
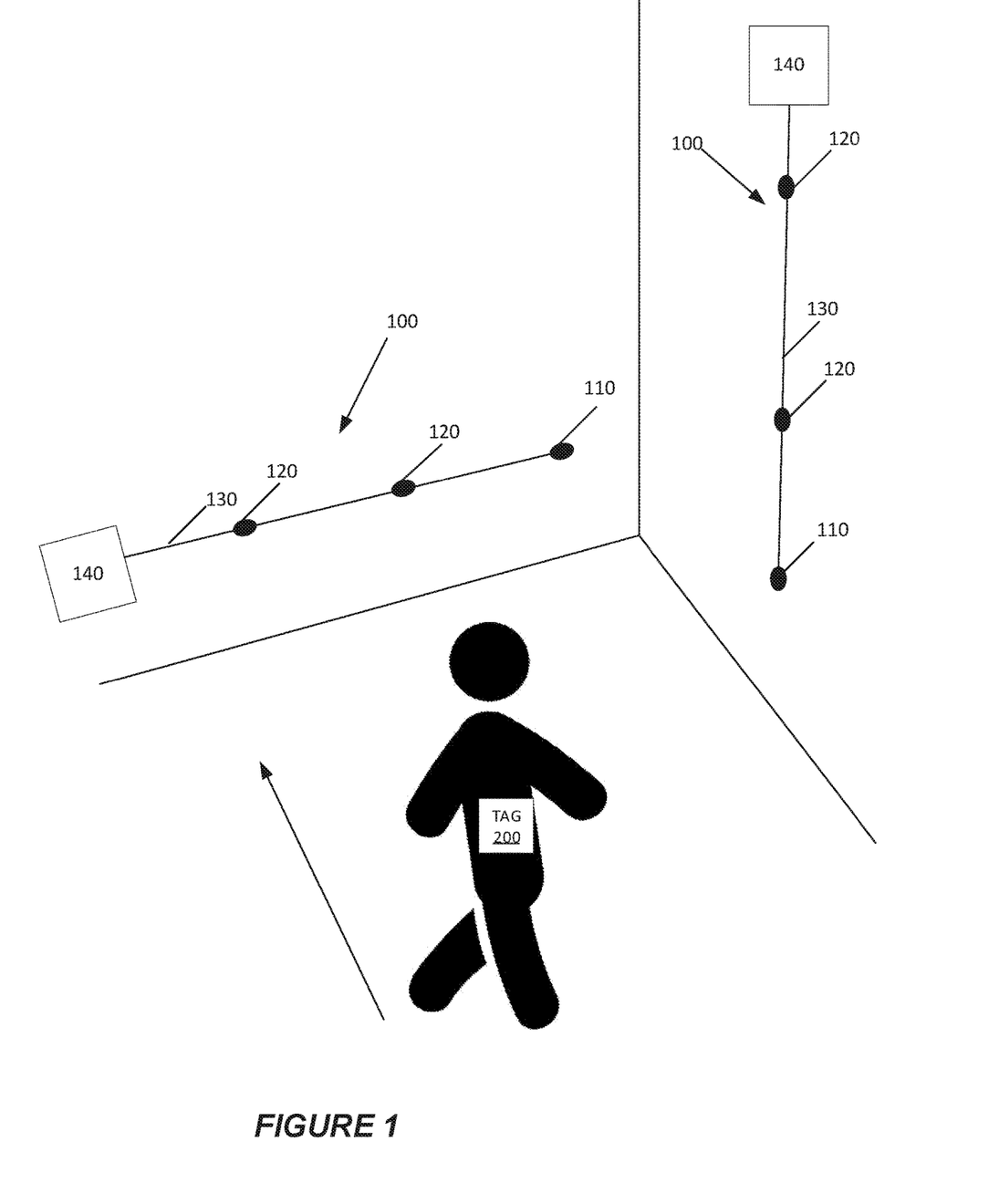
FIG. 1 shows an exemplary implementation of the anchor system of the solution disclosed herein.

FIG. 1 shows exemplary implementations for the solution presented herein. While FIG. 1 shows two anchor systems 100 in a room, it will be appreciated that the solution presented herein may be implemented with a single anchor system 100 in a room or with more than two anchor systems 100 in a room. Further, it will be appreciated that the solution presented herein is not limited to the vertical and horizontal orientations shown in FIG. 1.

In the exemplary embodiment of FIG. 1, two anchor systems 100 are secured to adjacent walls of a room. Each anchor system 100 includes an anchor cable 130, a first anchor device 110 affixed to the anchor cable 130, one or more second anchor devices 120 affixed to the anchor cable 130, and a power supply circuit 140. Each anchor device 110, 120, which is configured to communicate with at least one tag 200, e.g., on a moving person, is distributed along the cable 130 such that the distance between each second anchor device 120 and the first anchor device 110 along the cable 130 is known. Each anchor device 110, 120 communicates with the tag(s) 200 using any applicable technique. As shown by the horizontally deployed anchor system 100 in FIG. 1, the first and second anchor devices 110, 120 may be distributed evenly along the cable 130. Alternatively, as shown by the vertically deployed anchor system 100 in FIG. 1, at least some of the first and second anchor devices 110, 120 may be distributed unevenly along the cable 130.

Each anchor cable 130 may be deployed to communicate with one or more tag devices 200, which are generally mounted to one or more mobile objects or people, so as to enable a remote network of processors to determine the location of the tag device(s) 200 based on the communications between the anchor devices 110, 120 and the tag device(s) 200. Each tag device 200 may comprise any known tag used as part of an anchor/tag location system. Each mobile object/person may include one or more tags 200 mounted to that object/person. Exemplary objects include, but are not limited to, storage containers, vehicles, boxes, carts, etc.

FIG. 1 shows the first anchor device 110 affixed to one end of cable 130. It will be appreciated, however, that the first anchor device 110 may be affixed to the anchor cable 130 at any location along the length of the anchor cable 130, and that it is not required for the first anchor device 110 to be located on or near an end of the anchor cable 130. Instead, the solution presented herein allows the first anchor device 110 to be any anchor device of the cable 130 where the distance along the cable 130 between this designated first anchor device 110 and each of the second anchor devices 120 is known.

FIG. 1 also shows an embodiment where the power supply circuit 140 is affixed to one end of cable 130. While this implementation may be preferred for some embodiments, it will be appreciated that the power supply circuit 140 may be affixed anywhere along the cable 130 as long as the power supply circuit 140 is operatively connected to each of the anchor devices 110, 120 affixed to the anchor cable 130.

Figure 2:
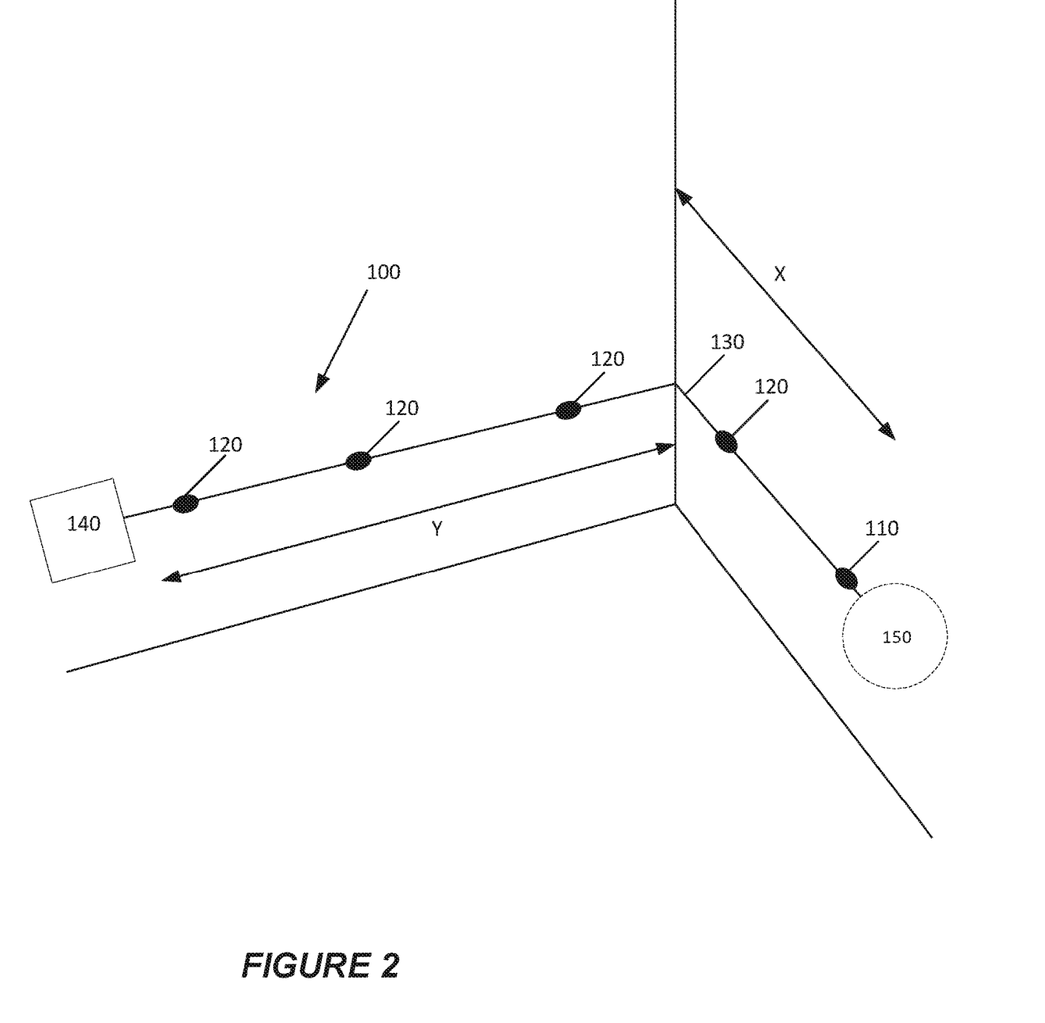
FIG. 2 shows another exemplary implementation of the anchor system of the solution disclosed herein.
Figure 4:
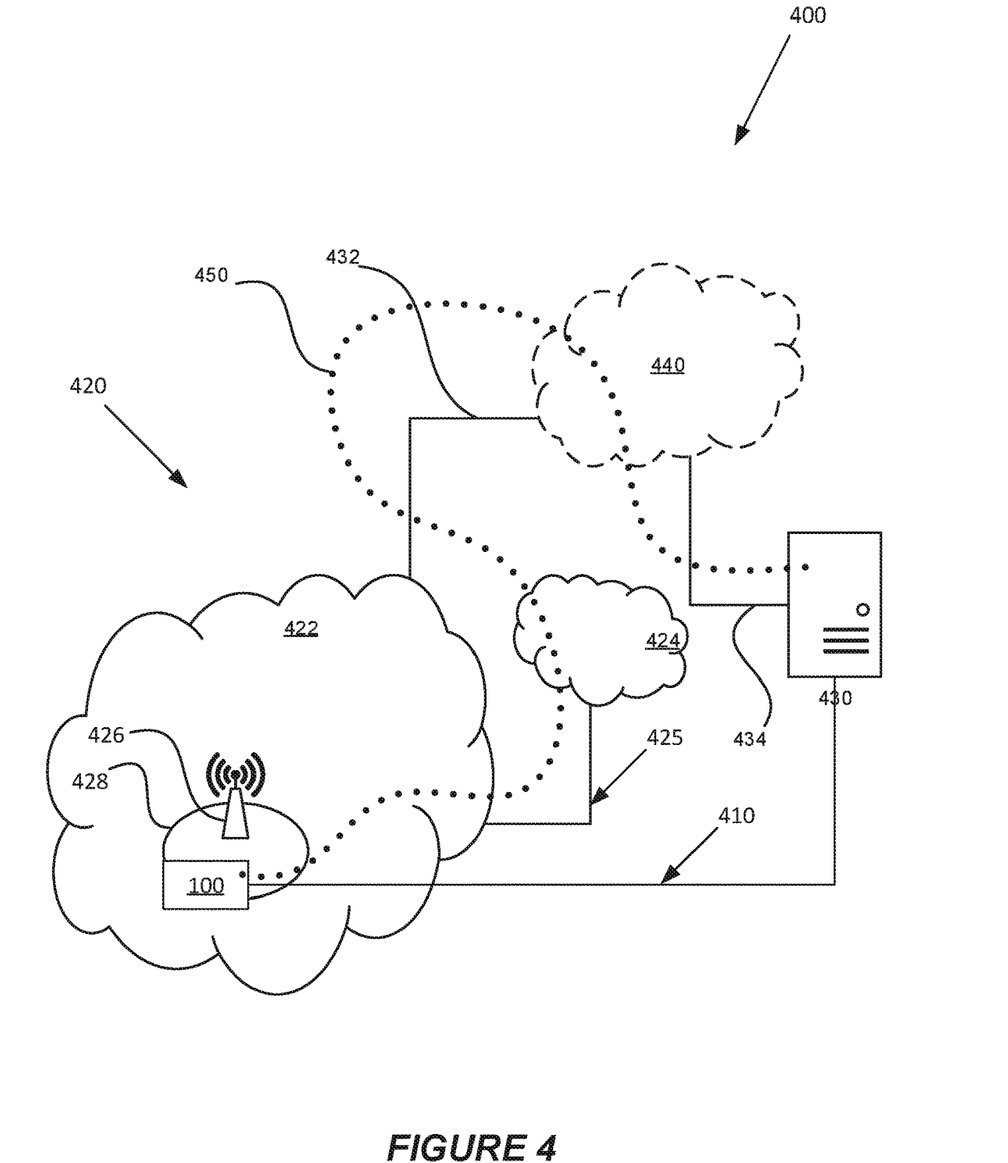
FIG. 4 shows a telecommunications network in accordance with embodiments disclosed herein.

In some embodiments, the anchor system 100 includes a transceiver connection 150 (FIG. 2) operatively connected to each of the first and second anchor devices 110, 120 via the anchor cable 130. Transceiver connection 150 provides connectivity between the anchor devices 110, 120 and a remote network of processors 430, e.g., the "cloud" (FIG. 4). In some embodiments, transceiver connection 150 comprises an Ethernet connection 150 that provides wired connectivity between the anchor devices 110, 120 and the remote network of processors 430. In some embodiments, transceiver connection 150 comprises a wireless connection 150 that provides wireless connectivity between the anchor devices 110, 120 and the remote network of processors 430.

FIG. 1 shows anchor systems 100 deployed on straight walls of a room with right-angle corners along straight lines of the corresponding wall, where each anchor system 100 is only deployed along one wall and in one direction. It will be appreciated, however, that the anchor system 100 disclosed herein may be deployed along any surface where an anchor cable 130 may be mounted. It will further be appreciated that the solution presented herein allows an anchor cable 130 to curve or otherwise bend to follow the natural curve of a surface, to go around corners (e.g., FIG. 2), to change directions, etc. When the deployed anchor cable 130 includes one or more curves/bends, the solution presented herein may further include determining the location of each second anchor device 120 relative to the anchor location using the location of the first anchor device 110, the distance along the cable 130 between the first anchor device 110 and the second anchor device 120 of interest, and information regarding each bend in the cable 130. For example, a calibration algorithm may determine geographic coordinates defining the location of the second anchor device 120 closest to the power supply circuit 140 within the room of FIG. 2 using determined coordinates of the first anchor device 110, the distance along the cable 130 between this second anchor device 120 and the first anchor device 110, and information regarding how the cable 130 bends in the corner, e.g., a 90° bend a distance of "X" from the first anchor device 110 and/or a 90° bend a distance of "Y" from the second anchor device 120. In another example, the calibration algorithm may use the bend information as a constraint, e.g., to constrain the distance between a first anchor device 110 and a second anchor device 120 to a maximum value (i.e., the distance if there was no bend).

Figure 3A:
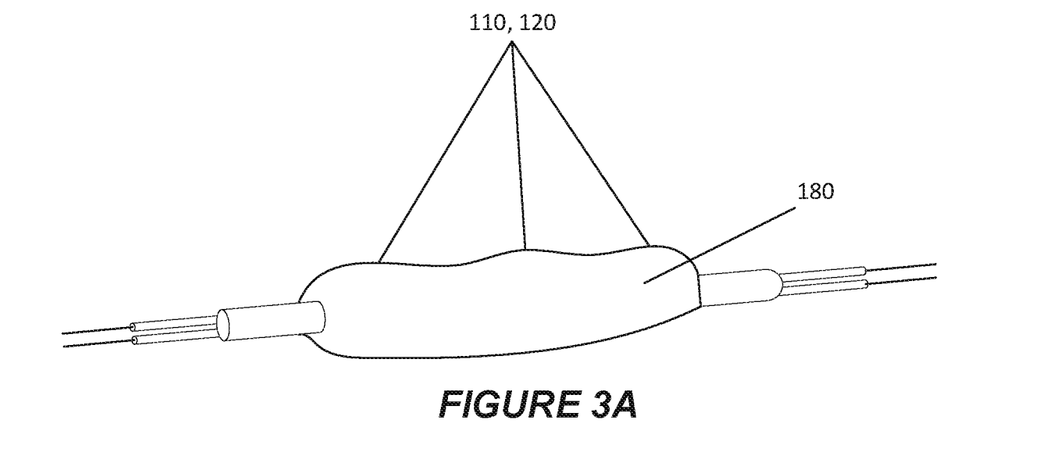
FIGS. 3A-3C show various options for anchor devices according to the solution presented herein.
Figure 3B:
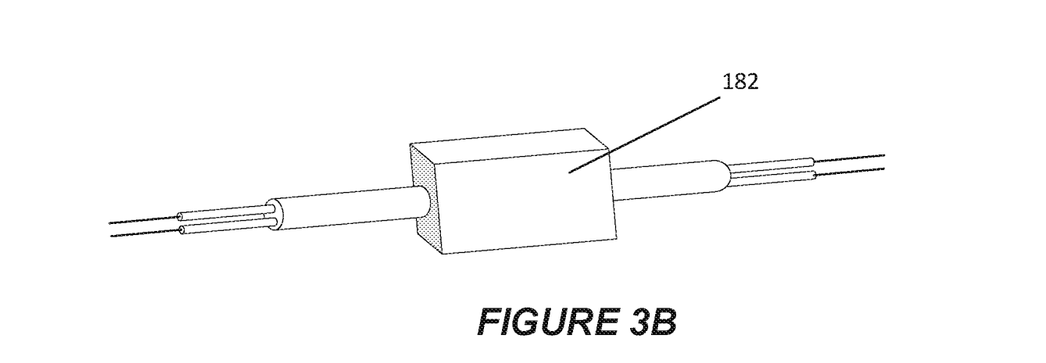
Figure 3C:
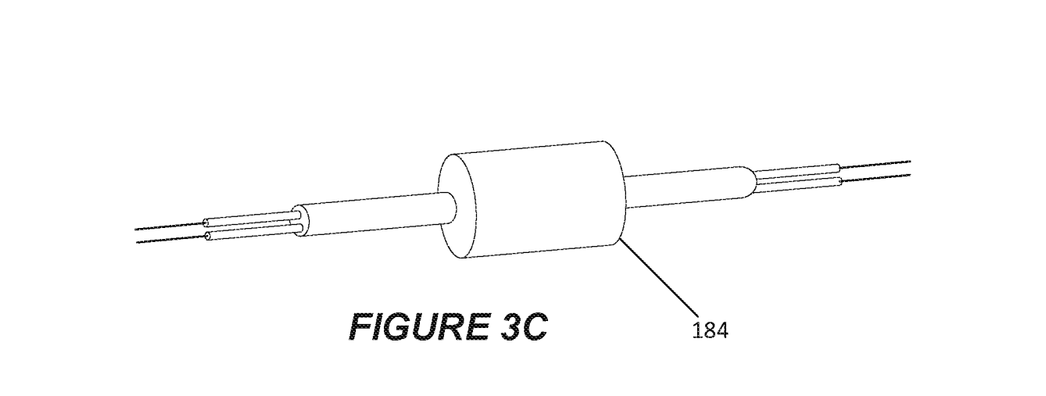

Anchor devices 110, 120 may be affixed to the anchor cable 130 using any affixing technique. For example, FIGS. 3A-3C show multiple affixing options for affixing the anchor devices 110, 120 to the cable 130. In FIG. 3A, the anchor devices 110, 120 are affixed to the anchor cable 130 using shrink wrap 180. In FIG. 3B, the anchor devices 110, 120 are affixed to the anchor cable 130 using a cubic encapsulating structure 182. In FIG. 3C, the anchor devices 110, 120 are affixed to the anchor cable 130 using a cylindrical encapsulating structure 184. It will be appreciated that other affixing techniques may be used to affix the anchor devices 110, 120 to the cable 130. In some embodiments, the anchor devices 110, 120 are affixed within the cable 130. In other embodiments, the anchor devices 110, 120 are affixed to the cable 130 such that the anchor devices 110, 120 are only partially disposed within the anchor cable 130.

FIG. 4 shows a telecommunication network 400 in accordance with some embodiments. In accordance with FIG. 4, anchor device 110, 120 may communicate with a remote network of processors 430, e.g., "the cloud," via a wired connection 410, e.g., an Ethernet connection, or a wireless network 420. While any wireless network 420 may be used, FIG. 4 shows an exemplary 3GPP-type ($3^{rd}$ Generation Partnership Project type) cellular network, which comprises access network 422, e.g., a radio access network, and core network 424. Access network 422 comprises one or more base stations 426, e.g., Node Bs (NBs), Evolved or E-UTRAN (evolved Universal Terrestrial Radio Access Network) NBs (eNBs), New Radio (NR) Base Station (gNBs) or other types of wireless access points, each defining a corresponding coverage area 428. Each base station 426 is connectable to core network 424 over a wired or wireless connection 425. In the wireless embodiment, anchor device 110, 120 located in coverage area 428 is configured to wirelessly connect to, or be paged by, the corresponding base station 426.

Telecommunication network 400 is itself connected to the remote network of processors 430, which may be embodied in the hardware and/or software of a standalone server, a cloud-implemented server, a distributed server, or as processing resources in a server farm. The remote network of processors 430 may be under the ownership or control of a service provider, or may be operated by the service provider or on behalf of the service provider. Connections 432 and 434 between telecommunication network 420 and the remote network of processors 430 may extend directly from core network 424 to the remote network of processors 430 or may go via an optional intermediate network 440. Intermediate network 440 may be one of, or a combination of more than one of, a public, private or hosted network; intermediate network 440, if any, may be a backbone network or the Internet; in particular, intermediate network 440 may comprise two or more sub-networks (not shown).

The communication system of FIG. 4 as a whole enables connectivity between the connected anchor devices 110, 120 and the remote network of processors 430. The connectivity may be described as an over-the-top (OTT) connection 450. When wireless connectivity is relied upon, the remote network of processors 430 and the connected anchor device(s) 110, 120 are configured to communicate data and/or signaling via OTT connection 450, using access network 422, core network 424, any intermediate network 440 and possible further infrastructure (not shown) as intermediaries. OTT connection 450 may be transparent in the sense that the participating communication devices through which OTT connection 450 passes are unaware of routing of uplink and downlink communications. For example, base station 426 may not or need not be informed about the past routing of an incoming downlink communication with data originating from the remote network of processors 430 to be forwarded (e.g., handed over) to a connected anchor device 110, 120. Similarly, base station 426 may not or need not be aware of the future routing of an outgoing uplink communication originating from the anchor device 110, 120 towards the remote network of processors 430.

Figure 5:
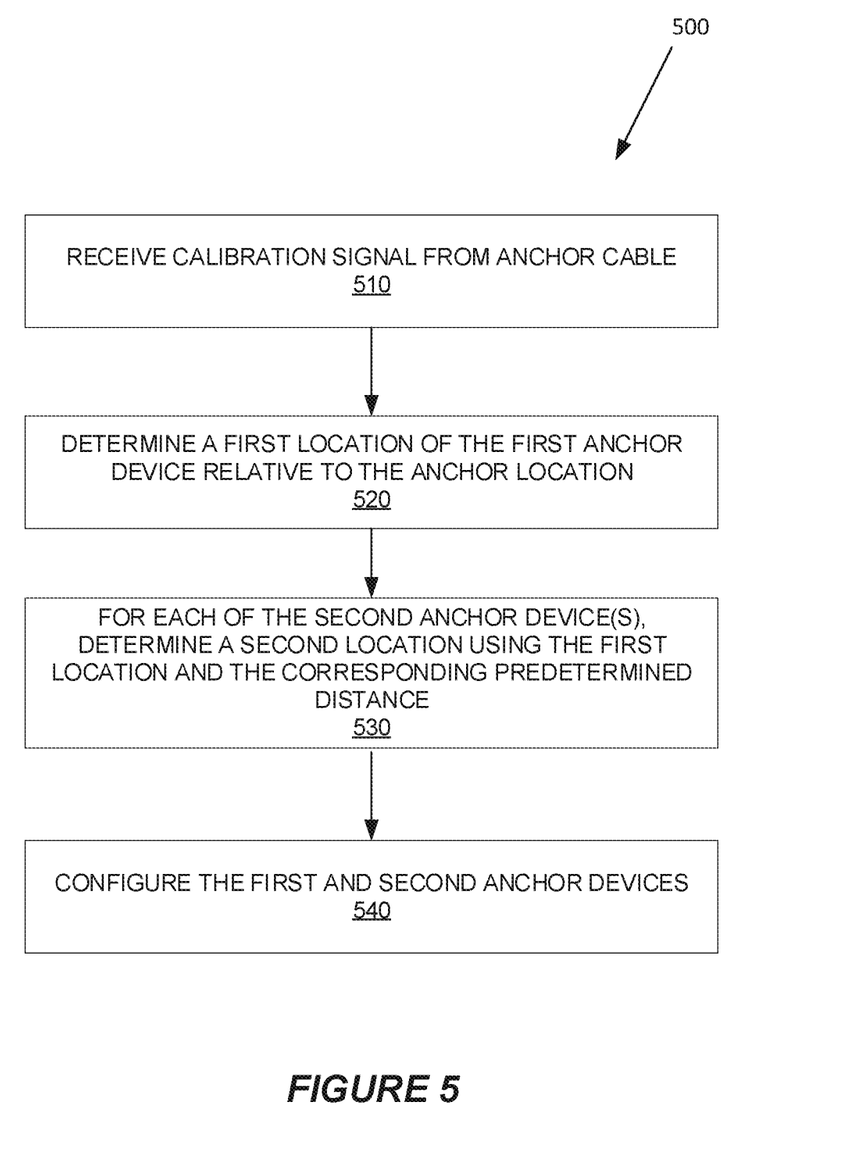
FIG. 5 shows an exemplary method of deploying anchor devices according to the solution presented herein.

FIG. 5 depicts a method 500 of deploying a plurality of anchor devices 110, 120 at an anchor location in accordance with particular embodiments of the solution presented herein. The plurality of anchor devices 110, 120 are configured to communicate with a tag device 200 mounted to a mobile entity. The method includes receiving, at a remote network of processors 430, a calibration signal from an anchor system 100 placed at the anchor location (block 510).

The anchor system comprises an anchor cable 130, a first anchor device 110 affixed to the anchor cable 130, one or more second anchor devices 120 affixed to the anchor cable 130, and a power supply circuit 140. Each of the one or more second anchor devices 120 is spaced from the first anchor device 110 along a length of the anchor cable 130 by a predetermined distance. The power supply circuit 140 is operatively connected to the anchor cable 130 and is configured to supply power to each of the first and second anchor devices 110, 120 via one or more power lines disposed within the anchor cable 130. The method further includes determining, at the remote network of processors 430, a location of each of the first and second anchor devices 110, 120 responsive to the calibration signal. The remote network of processors 430 determines these locations by determining a first location of the first anchor device 110 relative to the anchor location (block 520), and for each of the one or more second anchor devices 120, determining a second location using the first location and the corresponding predetermined distance (block 530). The method further includes configuring the first and second anchor devices 110, 120 to wirelessly communicate with the tag device 200 to enable the remote network of processors to determine location data for the tag device 200 (block 540). Once the anchor devices are configured, the remote network of processors may, e.g., determine the location of the tag device 200 using information provided by the wireless communications between the anchor device(s) 110, 120 and the tag device 200.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
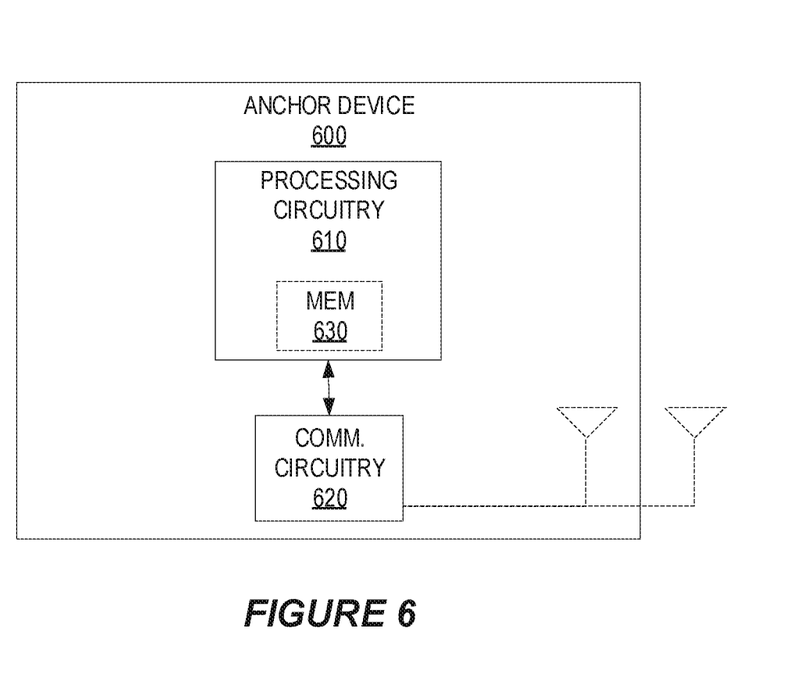
FIG. 6 shows a block diagram of an exemplary anchor device according to the solution presented herein.

FIG. 6, for example, shows an anchor device 600, which corresponds to the anchor devices 110, 120 described herein, as implemented in accordance with one or more embodiments of the solution presented herein. As shown, anchor device 600 includes processing circuitry 610 and communication circuitry 620. The communication circuitry 620 (e.g., radio circuitry) is configured to transmit and/or receive information to and/or from one or more tag devices 200 and/or to/from the remote processor 430, e.g., via any communication technology. Such communications may occur via one or more antennas that are either internal or external to the anchor device 600. The processing circuitry 610 is configured to perform processing described above, such as by executing instructions stored in memory 630. The processing circuitry 610 in this regard may implement certain functional means, units, or modules.

Figure 7:
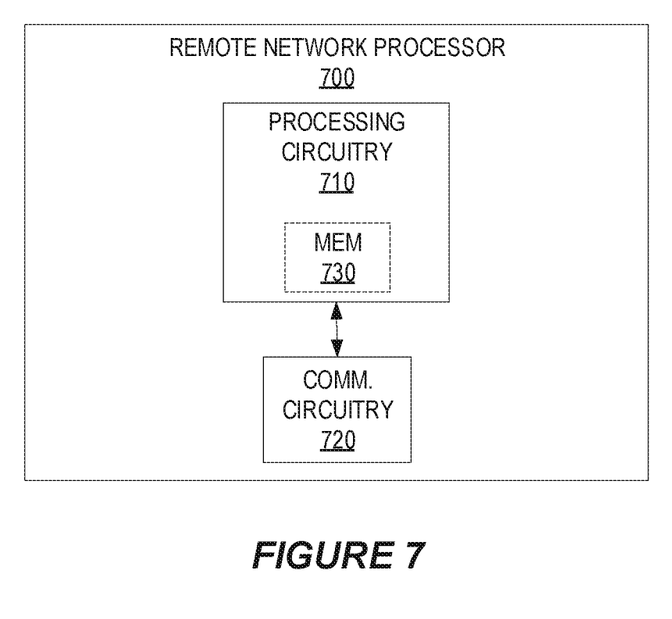
FIG. 7 shows a block diagram of a network processor according to the solution presented herein.

FIG. 7 shows a remote network processor 700, which corresponds to the remote processor/network of processors 430 described herein, as implemented in accordance with one or more embodiments of the solution presented herein. The remote network processor 700 may be a single processor, or part of a remote network of multiple processors. The cloud represents one exemplary remote network of processor(s). As shown, network processor 700 includes processing circuitry 710 and communication circuitry 720. The communication circuitry 720 is configured to transmit and/or receive information to and/or from one or more anchor devices 110, 120, e.g., via any wired or wireless communication technology. The processing circuitry 710 is configured to perform processing described above, such as by executing instructions stored in memory 730. The processing circuitry 710 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless/wired network types for illustrative purposes, but the embodiments are similarly applicable in other contexts and/or wireless/wired network types not explicitly described.

The proposed solution is to create a cable-like infrastructure, e.g., cable 130 that integrates Anchor devices 110, 120;
Power supply circuit 140 for the anchor devices 110, 120; and
Optionally, network/transceiver (Ethernet) connection 150 to the anchor devices 110, 120 to provide wired connectivity to the cloud.

The anchor devices 110, 120 are, e.g., printed circuit boards (PCBs) that are encapsulated at least partially in the cable 130, e.g., shrink-wrapped or cubic or cylinder form. The power supply to each anchor device 110, 120 is provided by the power supply circuit 140 via the cable 130. The optional network/transceiver (Ethernet) connection 150 can be added to the cable 130 by integrated power and Ethernet cable.

Calibration is quick and easy because the distances between the anchor devices 110, 120 (or between the first anchor device 110 and each second anchor device 120) along the length of the cable 130 are known. Thus, an automatic calibration algorithm can be supported by anchor-to-anchor distance information. That information helps the algorithm to calculate more accurate anchor positions.

Further, configuration is quick. The configuration of the anchor devices 110, 120 can be accelerated because the location of each anchor device 110, 120 is known. Sometimes it is difficult to find conventionally (and individually) deployed anchors in large industrial halls or at high installations. With the cable anchor solution presented herein, it is enough to identify the cable 130, e.g., via markings on the cable 130, to know which anchor devices 110, 120 and in which order are installed along the cable 130.

Although the subject matter described herein may be implemented in any appropriate type of system using any suitable components, some embodiments disclosed herein are described in relation to a wireless network. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable $2^{nd}$ Generation (2G), $3^{rd}$ Generation (3G), $4^{th}$ Generation (4G), $5^{th}$ Generation (5G), etc., standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

The wireless network may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network nodes in the wireless network comprise various components that work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs), NR NodeBs (gNBs), etc.). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobile Management Entities (MMEs), etc.), Operation & Maintenance (O&M) nodes, Operations Support System (OSS) nodes, Self Optimized Network (SON) nodes, positioning nodes (e.g., evolved Serving Mobile Location Centers (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device, e.g., anchor devices 110, 120 or transceiver connection 150, with access to the wireless network or to provide some service to a wireless device that has accessed the wireless network.

As used herein, wireless device (WD) refers to a device capable, configured, arranged and/or operable to communicate wirelessly with network nodes and/or other wireless devices. In some embodiments, each anchor device 110, 120 in cable 130 may be configured as a wireless device capable of wirelessly communicating with the network nodes and/or tag 200. In other embodiments, transceiver connection 150 for cable 130 may be configured as the wireless device for the cable 130 that wirelessly communicates with the network nodes. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a User Equipment (UE) implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

The solution presented herein provides several advantages. First, by affixing multiple anchor devices 110, 120 to a cable 130, multiple anchor devices 110, 120 may be quickly and easily installed, removed, moved to another location, etc. Thus, many anchors 110, 120 may deployed at the same time. The solution presented herein is also applicable in many different environments, even without any local infrastructure support. Further, the solution presented herein can be connected to one power supply, and in some embodiments on only one end of the cable 130, where the cable provides the connected power to all anchors 110, 120 in the cable 130, simplifying how power is provided to multiple anchor devices 110, 120. Calibration is also quick and easy because the locations of the anchor devices 110, 120 within the cable 130 are known in advance. Further, configuration is quicker because the anchor identifiers for the anchor devices 110, 120 in the cable 130 are known in advance.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A location system configured to track a location of a tag device mounted to a mobile entity, the location system comprising:
    an anchor system disposed at an anchor location, the anchor system comprising:
        an anchor cable;
        a first anchor device affixed to the anchor cable;
        one or more second anchor devices affixed to the anchor cable, each of the one or more second anchor devices spaced from the first anchor device along a length of the anchor cable by a predetermined distance; and
        a power supply circuit operatively connected to the anchor cable and configured to supply power to each of the first and second anchor devices via the anchor cable; and
    a remote network of processors configured to:
        receive a calibration signal from the anchor system;
        determine a location of each of the first and second anchor devices responsive to the calibration signal by determining a first location of the first anchor device relative to the anchor location;
        determine, for each of the one or more second anchor devices, a second location using the first location and the corresponding predetermined distance; and
        configure the first and second anchor devices to wirelessly communicate with the tag device to enable the remote network of processors to determine location data for the tag device.

2. The location system of claim 1, wherein the first and second anchor devices are distributed evenly along the length of the anchor cable.

3. The location system of claim 1, wherein at least some of the one or more second anchor devices are distributed unevenly along the length of the anchor cable.

4. The location system of claim 1, further comprising a transceiver connection operatively connected to each of the first and second anchor devices via the anchor cable to provide connectivity between the remote network of processors and the first and second anchor devices.

5. The location system of claim 4, wherein the transceiver connection comprises an Ethernet connection operatively providing wired connectivity between the remote network of processors and the first and second anchor devices.

6. The location system of claim 4, wherein the transceiver connection comprises a wireless connection operatively providing wireless connectivity between the remote network of processors and the first and second anchor devices.

7. The location system of claim 1, wherein each of the first and second anchor devices is affixed to the anchor cable using shrink wrap.

8. The location system of claim 1, wherein each of the first and second anchor devices is affixed to the anchor cable using a cubic or cylindrical encapsulating structure.

9. The location system of claim 1, wherein the first and second anchor devices are affixed to the anchor cable by being at least partially disposed within the anchor cable.

10. The location system of claim 1, wherein the first anchor device is affixed to one end of the anchor cable.

11. The location system of claim 1, wherein the power supply circuit is affixed to one end of the anchor cable.

12. A method of deploying a plurality of anchor devices at an anchor location, the plurality of anchor devices configured to communicate with a tag device mounted to a mobile entity, the method comprising:
    receiving, at a remote network of processors, a calibration signal from an anchor system placed at the anchor location, the anchor system comprising:
        an anchor cable;
        a first anchor device affixed to the anchor cable;
        one or more second anchor devices affixed to the anchor cable, each of the one or more second anchor devices spaced from the first anchor device along a length of the anchor cable by a predetermined distance; and
        a power supply circuit operatively connected to the anchor cable and configured to supply power to each of the first and second anchor devices via one or more power lines disposed within the anchor cable;
    determining, at the remote network of processors, a location of each of the first and second anchor devices responsive to the calibration signal by:
        determining a first location of the first anchor device relative to the anchor location; and
        for each of the one or more second anchor devices, determining a second location using the first location and the corresponding predetermined distance; and
    configuring the first and second anchor devices to wirelessly communicate with the tag device to enable the remote network of processors to determine location data for the tag device.

13. The method of claim 12 further comprising providing wired connectivity between the remote network of processors and the first and second anchor devices using an Ethernet connection operatively connected to each of the first and second anchor devices via the anchor cable.

14. The method of claim 12 further comprising providing wireless connectivity between the remote network of processors and the first and second anchor devices using a wireless transceiver connection operatively connected to each of the first and second anchor devices via the anchor cable.

15. The method of claim 12 further comprising receiving, at the remote network of processors, additional location information regarding the anchor cable relative to the anchor location, wherein said determining the second location for each of the one or more second anchor devices comprises determining, for each of the one or more second anchor devices, the second location using the first location, the corresponding predetermined distance, and the additional location information.

16. The method of claim 15 wherein the additional location information comprises at least one of:
    a number of bends in the anchor cable between the beginning and the end of the anchor cable; and
    a direction and an angle of one or more of the bends.

17. A remote network of processors configured to:
    receive, at the remote network of processors, a calibration signal from an anchor system placed at an anchor location, the anchor system comprising:
        an anchor cable;
        a first anchor device affixed to the anchor cable;
        one or more second anchor devices affixed to the anchor cable, each of the one or more second anchor devices spaced from the first anchor device along a length of the anchor cable by a predetermined distance; and
        a power supply circuit operatively connected to the anchor cable and configured to supply power to each of the first and second anchor devices via one or more power lines disposed within the anchor cable;
    determine, at the remote network of processors, a location of each of the first and second anchor devices responsive to the calibration signal by:
        determining a first location of the first anchor device relative to the anchor location; and
        for each of the one or more second anchor devices, determining a second location using the first location and the corresponding predetermined distance; and
    configure the first and second anchor devices to wirelessly communicate with a tag device to enable the remote network of processors to determine location data for the tag device.

18. A non-transitory computer-readable medium comprising a computer program product for controlling at least one processing circuit of a remote network of processors, the computer program product comprising software instructions which, when run on the at least one processing circuit in the remote network of processors, causes the remote network of processors to:
    receive, at the remote network of processors, a calibration signal from an anchor system placed at an anchor location, the anchor system comprising:
        an anchor cable;
        a first anchor device affixed to the anchor cable;
        one or more second anchor devices affixed to the anchor cable, each of the one or more second anchor devices spaced from the first anchor device along a length of the anchor cable by a predetermined distance; and
        a power supply circuit operatively connected to the anchor cable and configured to supply power to each of the first and second anchor devices via one or more power lines disposed within the anchor cable;
    determine, at the remote network of processors, a location of each of the first and second anchor devices responsive to the calibration signal by:
        determining a first location of the first anchor device relative to the anchor location; and for each of the one or more second anchor devices, determining a second location using the first location and the corresponding predetermined distance; and configure the first and second anchor devices to wirelessly communicate with a tag device to enable the remote network of processors to determine location data for the tag device.

\* \* \* \* \*